United States Patent [19]
Fröhlich

[11] Patent Number: 4,983,990
[45] Date of Patent: Jan. 8, 1991

[54] METHOD AND APPARATUS FOR INDIVIDUALLY INSCRIBING PRINTED PRODUCTS IN AN IMBRICATED STREAM

[75] Inventor: Beat Fröhlich, Oberdürnten, Switzerland

[73] Assignee: Ferag AG, Hinwil, Switzerland

[21] Appl. No.: 361,502

[22] Filed: Jun. 5, 1989

[30] Foreign Application Priority Data

Jun. 16, 1988 [CH] Switzerland .................... 02327/88

[51] Int. Cl.[5] .................... G01D 15/18; B65H 9/16

[52] U.S. Cl. .................... 346/1.1; 346/75; 346/140 R; 271/250; 271/251

[58] Field of Search .................... 346/751, 140 R, 1.1; 271/204, 250, 251

[56] References Cited

U.S. PATENT DOCUMENTS

| | | | |
|---|---|---|---|
| 2,240,424 | 4/1941 | Spiess | 271/49 |
| 4,393,386 | 7/1983 | DiGiulio | 346/75 |
| 4,426,073 | 1/1984 | Mizuma | 271/251 |
| 4,538,161 | 8/1985 | Reist | 346/140 R |
| 4,685,664 | 8/1987 | Petersdorf | 271/227 |

FOREIGN PATENT DOCUMENTS

| | | |
|---|---|---|
| 0096228 | 3/1985 | European Pat. Off. . |
| 921679 | 3/1963 | United Kingdom . |

*Primary Examiner*—Bruce A. Reynolds
*Assistant Examiner*—Gerald E. Preston
*Attorney, Agent, or Firm*—Bell, Seltzer, Park & Gibson

[57] ABSTRACT

This invention relates to a device for printing on printed products (20) which are transported past an ink jet writer (34') in an imbricated stream by means of a conveying device. A sensor (34, 35) triggers a writing operation of the ink jet writer when a printed product (20) has reached the writing area of the latter. Therefore, the printed products (20) can also be inscribed in an imbricated stream conveyed in a freely supported manner. The conveying device, in the area of the ink jet writer (34') is provided with means (12) which laterally displace the printed products individually during transportation of the printed products (20) in the imbricated stream.

13 Claims, 1 Drawing Sheet

METHOD AND APPARATUS FOR INDIVIDUALLY INSCRIBING PRINTED PRODUCTS IN AN IMBRICATED STREAM

FIELD OF THE INVENTION

The present invention relates to an apparatus for individually inscribing, for example addressing, printed products, such as newspapers, appearing in an imbricated stream.

BACKGROUND OF THE INVENTION

European Patent Specification No. 0,096,228 (largely identical in content to U.S. Pat. No. 4,538,161 to Reist) discloses an apparatus intended for addressing. In this apparatus, the conveying device is a single conveyor fitted with grippers. Each gripper conveys one printed product by seizing it at its leading edge. The trailing edge, on the other hand, slides on a slide table which is arranged in the area of an ink jet writer. The ink jet writer has a plurality of spray heads which are directed from below toward the trailing edges of the printed product which protrude laterally beyond the slide table. The ink jet writer is controlled by control signals which are produced by a transmitter coupled to the single conveyor so that inter alia, the writing speed of the ink jet writer is adapted to the conveying speed of the single conveyor. In addition, the single conveyor has allocated to it a detector which responds to empty grippers running past and then suppresses the control signal. This prevents a printed product which follows an empty gripper in the stream of printed products sliding continuously over the slide table from being inscribed with two addresses. In addition, the addresses are retrieved from an address register likewise controlling the ink jet writer.

This known apparatus has proven successful in that it is not necessary to singularize or space the stream of printed products appearing to the extent that gaps develop between successive printed products. In a singularized stream, the gaps are, for example, sensed photoelectrically in order to then trigger the start of a further inscribing operation. This is the case with the apparatus called the "Videojet Mailer," which is sold by the A. B. Dick Company, Elk Grove Village, Ill. In this arrangement, it should be noted that any singularization and the inevitable resulting increase in the conveying speed of the printed products has not proven to be satisfactory because, for example, the possible writing speed of the ink jet writer is not able to cope with the increased conveying speed. Also, after singularization, the printed products generally have to be transferred again into an imbricated formation for further processing. Further, singularization of the entire output of a modern printing press would lead to conveying speeds which are so high that they would be comparatively difficult to control and would involve the risk of damage to the individual printed products.

Additionally, Reist is not suitable for inscribing copies appearing freely supported in an imbricated stream, since an essential part of the control of the ink jet writer depends on the presence of a loaded gripper of the single conveyor.

The object of the invention is therefore to create an apparatus suitable for inscribing printed products appearing freely supported in the imbricated stream without having to singularize these printed products from the imbricated stream.

SUMMARY OF THE INVENTION

Accordingly, the above and other objects of the present invention are achieved by the provision of an apparatus comprising an ink jet writer and a conveying device for directing the printed products along a path past the ink jet writer. A sensor triggers a writing operation whenever a printed product reaches the writing area of the ink jet writer. The apparatus further comprises means adjacent the ink jet writer for laterally displacing the printed products in the imbricated stream.

In the preferred embodiment, the conveying device comprises a first conveying means, a second conveying means receiving the stream from the second means. The second conveying means has a conveying direction which is at an obtuse direction to the conveying directions of the first and third conveying means therefore laterally displacing the printed products, and so as to serially expose the side margins of the products and position each exposed side margin at the writing area of the ink jet writer.

BRIEF DESCRIPTION OF THE DRAWINGS

An exemplary embodiment of the invention is described in greater detail below with reference to the drawing, in which.

DETAILED DESCRIPTION OF THE PREFERRED EMBODIMENT

Figure 1:
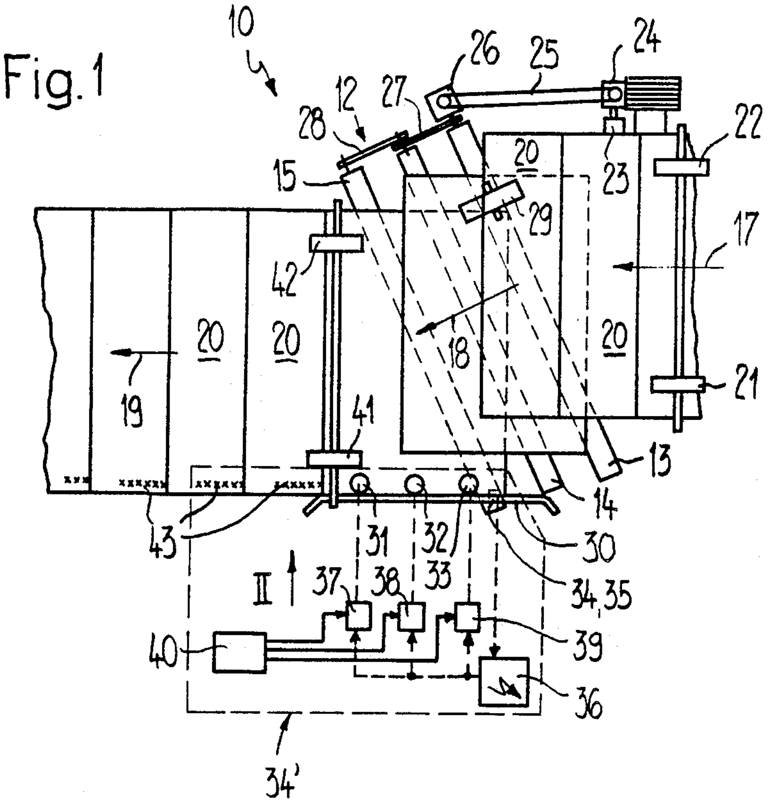
FIG. 1 shows a schematic top plan view of an apparatus according to the invention.
Figure 2:
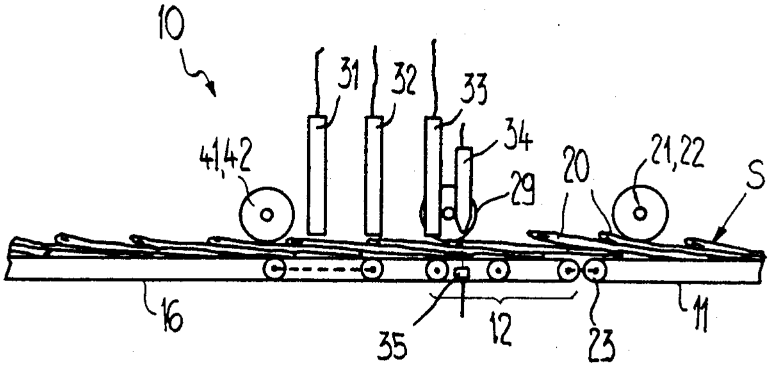
FIG. 2 shows a fragmentary side view of the apparatus viewed in the direction of arrow II in FIG. 1.

Referring to the drawings, FIGS. 1 and 2 illustrate a preferred embodiment of an inscribing apparatus 10 which embodies the features of the present invention. The apparatus 10 has a conveying device comprising a first conveyor belt 11 (FIG. 2) and an adjoining roll track 12 for receiving articles from the first conveyor belt 11. The roll track 12 preferably includes three driven rolls 13, 14, and 15. Adjoining the roll track 12 is a second conveyor belt 16 for receiving articles from the roll track 12. The conveying direction of the conveyor belt 11 is indicated by arrow 17 (FIG. 1). The conveying direction of roll track 12 is indicated by arrow 18 which is at an obtuse angle with the conveying direction of conveyor belt 11. The conveying direction of conveyor belt 16 is indicated by arrow 19 and is also at an obtuse angle with the conveying direction of the roll track 12. Preferably the second conveyor belt 16 is generally parallel and offset with respect to the first conveyor belt 11.

The conveying device constructed in this way is used for transporting newspapers 20 which appear in an imbricated stream S and which, as usual, are transported with a fold or binding leading and overlapping the trailing edge of the preceding newspaper. The first conveyor belt 11, the roll track 12, and the second conveyor belt 16 are operatively associated so that the stream S passes sequentially from the first Conveyor belt 11, to the roll track 12, and to the second conveyor belt 16.

Positioned adjacent the end area of the conveyor belt 11 is a pair of, for example, pressure rollers 21, 22 which are mounted in a freely rotatable manner and ensure that the conveyed newspapers 20 maintain the conveying direction 17 even when their leading fold has already left the conveyor belt 11.

The rolls 13, 14, and 15 of the roll track 12 are driven by the last return drum 23 of the conveying belt 11, for example via an angular gear 24, a chain drive 25 and a further angular gear 26. The rolls 13, 14, 15 are coupled to one another by means of further chain drives 27 and 28. A pressure roller 29 is positioned adjacent the roll 13 with its axis parallel to the axis of the roll 13 and positioned a distance from the pressure roller 22 approximately corresponding to the size of a newspaper 20 measured in direction 17 (i.e. the length of a folded newspaper). Thus each newspaper 20 leaving the pressure rollers 21, 22 is immediately forced to follow the conveying direction 18 of the roll track 12. In this arrangement, it is advantageous to select the transmission ratio of the drive leading to the rolls 13, 14 and 15 in such a way that the conveying speed of the roll track 12 has a component parallel to the conveying direction of the conveyor belt 11 which is approximately the same as the conveying speed of the conveyor belt 11. In other words, the speed the roll track 12 is selected so that the speed of the newspapers 20 is substantially constant in the right to left direction. Accordingly, the speed of the newspapers 20 on the roll track 12 is actually faster than the speed of the newspaper on the conveyors 11 or 16 because of the obtuse angle. Thus the lateral displacement of the newspapers can take place free of any jerking motion to the extent possible.

Positioned adjacent the end of the roll track 12 is a lateral stop rail 30 which orientates the newspaper 20, after being transported obliquely by the roll track 12, according to their left-hand lateral edge (as viewed in the conveying direction). The stop rail 30 is parallel to the conveying direction 19 of the conveyor belt 16. In the illustrated embodiment, three writing heads 31, 32, and 33 of an ink jet writer 34' are mounted adjacent the stop rail 30. The ink jet writer 34' may essentially correspond to a writer as sold under the name "Videojet Serial 9400" by the above mentioned company A. B. Dick. A writing operation of the ink jet writer 34' is triggered by a sensor. In the preferred embodiment, the sensor is the light barrier type consisting of light source 34 and light receiver 35. The sensor, via a central control unit 36, controls the writing heads 31, 32, 33 via individual control units 37, 38, 39. These control units are coupled to a built-in or even external address register 40.

As soon as the trailing, left-hand carrier of a newspaper 20 interrupts the light barrier 34, 35, a writing operation is triggered. At the same time the leading edge of the newspaper moves into the gap between the start of the conveying belt 16 and the pressure rollers 41, and 42. Therefore the newspaper is positively transported in direction 19 as the writing heads 31, 32, 33 write on the exposed said margin of the newspaper. The writer operation conveniently starts at the same time for each of the writing heads.

The newspapers which leave the area of the stop rail 30 or the writing heads 31, 32, 33 are transported further in imbricated formation on the conveying belt 16. The newspapers are provided with an inscription, for example an address 43 on the margin appearing on the left as viewed in conveying direction 19, the writing head 31 writing, for example, only the name, the writing head 32 writing only the street name and the writing head 33 writing only the place name of the address.

Even if an empty space should appear in the imbricated stream, inscriptions "into space" or "double inscriptions" are impossible, since the copy-by-copy lateral displacement virtually amounts to a partial singularization, and each copy triggers by itself the writing operation intended for it.

In the drawings and the specification there has been set forth a preferred embodiment of the invention, and although specific terms are employed, they are used in a generic sense only and not for purposes of limitation.

That which is claimed is:

1. An apparatus for individually inscribing printed products (20) in an imbricated stream S, comprising an ink jet writer (34'), product conveying means (11, 12, 16) for directing the printed products past the ink jet writer (34'), a sensor (34, 35) for triggering a writing operation when a printed product (20) reaches the writing area of the ink jet writer (34'), said product conveying means including means (12) adjacent the ink jet writer (34') for laterally displacing the printed products individually during the transportation of the printed products (20) in the imbricated stream and so as to serially expose the side margins of the products and position each exposed side margin at said writing area of the ink jet writer.

2. The apparatus as claimed in claim 1, wherein said product conveying means is comprised of a first conveying means (11) for directing the stream along a first direction (17), a second conveying means (12) for receiving the stream from said first conveying means and directing said stream along a second direction (18), and third conveying means (16) for receiving said stream from said second conveying means and directing said stream along a third direction (19), and wherein the second direction (18) is at an obtuse angle to the first and third conveying directions (17, 19) at at least the adjacent ends of the first and third conveying means (11, 16).

3. The apparatus as claimed in claim 2, wherein a lateral stop (30) is positioned adjacent the end of the second conveying means (12) and wherein said lateral stop (30) runs parallel to the third conveying direction (19) of the adjacent end of the third conveying means (16).

4. The apparatus as claimed in claim 2, wherein the second conveying means (12) comprises a roll track having driven rolls (13, 14, 15).

5. The apparatus as claimed in claim 4, wherein a pressure means is mounted adjacent at least one of said driven rolls for pressing the products thereagainst.

6. The apparatus as claimed in claim 3, wherein said first and third conveying directions (17, 19) are parallel, and wherein the conveying speed of the second conveying means (12) has a component which is parallel to the conveying directions (17, 19) of said first and third conveying means (11, 16) and wherein said component is generally the same as the conveying speed of said first conveying means (11).

7. The apparatus as claimed in any one of claims 1 to 6, wherein the ink jet writer (34') comprises a plurality of writing heads (31, 33, 33) directed onto the printed products.

8. The apparatus as claimed in either one of claims 3 or 6, wherein the ink jet writer (34') comprises a plurality of writing heads (31, 32, 33) arranged in a row, parallel to the conveying direction (19) of said third conveying means (16) and in general proximity with the lateral stop (30).

9. The apparatus as claimed in claim 8, wherein the ink jet writer (34') has a control unit (36) which is equipped for the purpose of simultaneously controlling each of the writing heads (31, 32, 33), as a function of the presence, detected by a sensor (34, 35), of a printed product (20) in the writing area of the writing heads (31, 32, 33) in order to perform a writing operation.

10. The apparatus as claimed in claim 7, wherein the ink jet writer (34') has a control unit (36) which is equipped for the purpose of simultaneously controlling each of the writing heads (31, 32, 33), as a function of the presence, detected by a sensor (34, 35), of a printed product (20) in the writing area of the writing heads (31, 32, 33), in order to perform a writing operation.

11. A method for individually inscribing printed products in an imbricated stream, comprising the steps of:

conveying the printed products in an imbricated stream at a predetermined speed along a first direction;

deflecting the conveyed stream of printed products laterally so as to laterally displace the products and serially expose a side margin of each printed product while maintaining the stream imbricated and without rotating the printed products from their orientation prior to being deflected; and printing indicia upon the exposed side margin of each printed product.

12. The method as defined in claim 11 comprising the further subsequent step of returning the deflected stream to a direction generally parallel to said first direction, and while maintaining the stream imbricated.

13. The method as claimed in claims 11 or 12 wherein the deflecting step includes maintaining the speed of movement of the stream so as to have a component in a direction parallel to said first direction which is substantially equal to said predetermined speed.

* * * * *